United States Patent
Himeno et al.

(10) Patent No.: US 8,637,416 B2
(45) Date of Patent: Jan. 28, 2014

(54) METHOD FOR MANUFACTURING ZEOLITE MEMBRANE, AND ZEOLITE MEMBRANE

(75) Inventors: Shuji Himeno, Nagaoka (JP); Teruaki Takeuchi, Nagaoka (JP); Shuichi Yoshida, Nagoya (JP); Kiyoshi Araki, Nagoya (JP); Toshihiro Tomita, Nagoya (JP)

(73) Assignees: NGK Insulators, Ltd., Nagoya (JP); Nagaoka University of Technology, Nagaoka (JP)

( * ) Notice: Subject to any disclaimer, the term of this patent is extended or adjusted under 35 U.S.C. 154(b) by 391 days.

(21) Appl. No.: 12/966,023

(22) Filed: Dec. 13, 2010

(65) Prior Publication Data

US 2011/0160039 A1    Jun. 30, 2011

(30) Foreign Application Priority Data

Dec. 25, 2009   (JP) ................................. 2009-293738

(51) Int. Cl.
    *B01J 29/06*      (2006.01)
    *B01J 35/00*      (2006.01)

(52) U.S. Cl.
    USPC ............................................... 502/4; 502/60

(58) Field of Classification Search
    USPC ..................................................... 502/4, 60
    See application file for complete search history.

(56) References Cited

U.S. PATENT DOCUMENTS 6,689,195 B1     2/2004   Anthonis et al.

FOREIGN PATENT DOCUMENTS

| EP | 1 163 046 A1 | 12/2001 |
|---|---|---|
| JP | 2004-344755 A1 | 12/2004 |
| JP | 2008-018387 A1 | 1/2008 |

OTHER PUBLICATIONS

Jonas Hedlund, et al., "*A Masking Technique for High Quality MFI Membranes*," Journal of Membrane Science, vol. 22, 2003, pp. 163-179.

M.J. den Exter, et al., "*Separation of Permanent Gases on the All-Silica 8-Ring Clathrasil DD3R*," Zeolites in Related Microporous Materials: State of the Art 1994, Studies in Surface Science and Catalysis, vol. 84, pp. 1159-1166.

*Primary Examiner* — Elizabeth Wood
(74) *Attorney, Agent, or Firm* — Burr & Brown, PLLC (57) ABSTRACT

There is provided a zeolite membrane which is thinner than a conventional membrane and which has improved permeability and a method for manufacturing the zeolite membrane. The method includes a surface layer forming step for forming a surface layer by attaching a low polar polymer on a first surface of a porous substrate to cover the surface, a filling step for filling a masking polymer into pores in the porous substrate from a surface different from the first surface of the porous substrate up to the surface layer by impregnating the porous substrate with the masking polymer and solidifying the masking polymer, and a surface layer removing step for removing the surface layer. After the surface layer removing step, a zeolite membrane is formed on the first surface of the porous substrate.

16 Claims, 4 Drawing Sheets

METHOD FOR MANUFACTURING ZEOLITE MEMBRANE, AND ZEOLITE MEMBRANE

BACKGROUND OF THE INVENTION

1. Field of the Invention

The present invention relates to a method for manufacturing a zeolite membrane for separating a mixed fluid and to a zeolite membrane.

2. Description of Related Art

Zeolite is used as a catalyst, a catalyst carrier, an adsorbent, and the like. In addition, a zeolite membrane formed on a surface of a porous substrate made of metal or ceramic is used as a gas separation membrane or a pervaporation membrane by using a molecular sieve function of zeolite. As to membrane separation with a zeolite membrane, a membrane used for dehydration of an organic solvent or biomass ethanol has been put to practical use in recent years.

In order to enhance the performance for using a zeolite membrane as a separation membrane, the improvement in separation factor and permeance is desired. That is, important issues for practical use of the zeolite membrane are compatibility of separation performance and permeation property. However, these are incompatible, and, for example, it is not easy to enhance the permeance without lowering the separation factor.

There is disclosed a method for improving permeation property by manufacturing a thin zeolite membrane uniformly. For example, there is disclosed a method for forming a thin and uniform zeolite membrane by, after impregnating a porous substrate with a certain substance, attaching a seed crystal on the surface (see JP-A-2008-18387 and JP-A-2004-344755). In addition, there is disclosed a method using two kinds of impregnation materials (impregnation material, preliminary impregnation masking material) (see EP 1163046 A1).

However, in the methods of JP-A-2008-18387 and JP-A-2004-344755, the depth control of a substance impregnating to the porous substrate is difficult, and the uniformity of the zeolite membrane formed on a surface of the porous substrate is not sufficient. In the method of EP 1163046 A1, in the case of impregnating a support with an impregnation material with forming a preliminary impregnation masking layer, the subsequent complete removal of the preliminary impregnation masking layer needs much time. For example, in the case of polymethylmethacrylate resin (polymethylmethacrylate, PMMA) cited as a preferable material for the preliminary impregnation masking layer, one week is required by acetone according to J. Hedlund et al., Journal of Membrane Science 222 (2003), 163-179. In the case of removing the preliminary impregnation masking layer, the support has to be impregnated with a substance insoluble in a solvent (e.g., acetone) used for removing the preliminary impregnation masking layer as the impregnation material. In addition, the impregnation material with which the support is impregnated should have a melting point not lower than zeolite synthesis temperature. Since many kinds of low polar polymers are hydrophobic, when it is used as the masking polymer (impregnation material) as in the EP 1163046 A1, the surface has a negative electric charge to repel a solvent such as water upon applying a seed crystal, and sufficient application on the surface of the porous substrate becomes difficult. Therefore, the "Journal of Membrane Science" 222 (2003) discloses a method where the electric charge is removed by applying a cation polymer on the surface of the porous substrate before the application of a seed crystal to subsequently apply a seed crystal. However, such a method leads to increase in production cost because the operation becomes complex to a large extent upon manufacturing a membrane.

SUMMARY OF THE INVENTION

The present invention aims to provide a zeolite membrane which is thinner than a conventional membrane and which has improved permeation property and a method for manufacturing the zeolite membrane.

As a result of the present inventors' earnest studies, they found out that the aforementioned problems can be solved by a method where a surface layer for covering the surface is formed on the first surface of the porous substrate by attaching a low polar polymer, the porous substrate is impregnated with a high polar polymer having low compatibility with the low polar polymer as the masking polymer, and then the surface layer is removed to form a zeolite membrane. That is, according to the present invention, there are provided the following method for manufacturing a zeolite membrane and the following zeolite membrane.

[1] A method for manufacturing a zeolite membrane including: a surface layer forming step for forming a surface layer on a first surface of a porous substrate by attaching a low polar polymer having a solubility parameter (SP value) of 8.0 $(cal/cm^3)^{1/2}$ or less to cover the surface, a filling step for filling a high polar polymer having low compatibility with the low polar polymer and a SP value of above 8.0 $(cal/cm^3)^{1/2}$ as a masking polymer into pores in the porous substrate from a surface different from the first surface of the porous substrate up to the surface layer by impregnating the porous substrate with the high polar polymer and solidifying the high polar polymer, a surface layer removing step for removing the surface layer, a seed crystal attaching step for attaching a seed crystal functioning as a seed for forming a zeolite membrane on the first surface of the porous substrate where the surface layer has been removed, a membrane forming step for forming a dense zeolite membrane containing a structure directing agent on the first surface of the porous substrate by growing the seed crystal, and a removing step for removing the structure directing agent from the dense zeolite membrane and removing the masking polymer from the porous substrate.

[2] The method for manufacturing a zeolite membrane according to [1], wherein the surface layer has a thickness of 1 to 2 μm with a part thereof being formed in the porous substrate and the rest being formed on the first surface of the porous substrate.

[3] The method for manufacturing a zeolite membrane according to [1] or [2], wherein the low polar polymer is at least one kind selected from the group consisting of paraffin wax, polyisobutylene, polyethylene, and polypropylene.

[4] The method for manufacturing a zeolite membrane according to any one of [1] to [3], wherein the masking polymer has a melting point higher than zeolite membrane forming temperature in the membrane forming step.

[5] The method for manufacturing a zeolite membrane according to any one of [1] to [4], wherein the seed crystal attaching step employs a dipping method where the porous substrate is immersed in a seeding sol.

[6] A zeolite membrane manufactured by a method according to any one of [1] to [5], wherein a part of the zeolite membrane is formed in the porous substrate and the rest is formed on the surface of the porous substrate to have a thickness of 1 to 2 μm, a separation factor of $CO_2$ with respect to $CH_4$ of 10 or more, and a $CO_2$ gas permeance of $5 \times 10^{-7}$ $mol/s/m^2/Pa$ or more.

In a method for manufacturing a zeolite membrane of the present invention, on the first surface of the porous substrate, a surface layer for covering the surface is formed by attaching a low polar polymer, and the porous substrate is impregnated with a masking polymer from a surface different from the first surface, thereby controlling the depth of the impregnation with the masking polymer. Therefore, by removing the surface layer and forming a zeolite membrane, the zeolite membrane can be made thinner than a conventional zeolite membrane, and high permeation property and high separation performance are compatible.

REFERENCE NUMERALS

1: porous substrate, 2: surface layer (low polar polymer), 3: masking polymer, 5: zeolite membrane, 11: membrane permeation testing apparatus, 12: separation module, 13: soap film flowmeter, 14: gas chromatography.

DETAILED DESCRIPTION OF THE INVENTION

Hereinbelow, embodiments of the present invention will be described with referring to drawings. The present invention is by no means limited to the following embodiments, and changes, modifications, improvements may be made as long as they do not deviate from the scope of the invention.

A method for manufacturing a zeolite membrane of the present invention includes a surface layer forming step for forming a surface layer on a first surface of a porous substrate by attaching a low polar polymer having a solubility parameter (SP value) of 8.0 $(cal/cm^3)^{1/2}$ or less to cover the surface, a filling step for filling high polar polymer having low compatibility with the low polar polymer and a SP value of above 8.0 $(cal/cm^3)^{1/2}$ as a masking polymer into pores in the porous substrate from a surface different from the first surface of the porous substrate up to the surface layer by impregnating the porous substrate with the high polar polymer and solidifying the high polar polymer, a surface layer removing step for removing the surface layer, a seed crystal attaching step for attaching a seed crystal functioning as a seed for forming a zeolite membrane on the first surface of the porous substrate where the surface layer has been removed, a membrane forming step for forming a dense zeolite membrane containing a structure directing agent on the first surface of the porous substrate by growing the seed crystal, and a removing step for removing the structure directing agent from the dense zeolite membrane and removing the masking polymer from the porous substrate.

Since a low polar polymer has a low melting point in comparison with a high polar polymer, and many low polar polymers are soft, a low polar polymer has good workability and can be applied on a surface of a porous substrate by various methods. Therefore, a low polar polymer is excellent as a material for uniformly forming a surface layer on a surface of the porous substrate. Since a surface layer forming step for forming a surface layer by attaching a low polar polymer, the impregnation depth of a masking polymer is controlled in the subsequent filling step of a masking polymer into the porous substrate. Therefore, after the surface layer removing step for removing the surface layer, the zeolite membrane can be made thinner than a conventional membrane, and high permeation property can be obtained.

Here, a low polar polymer means a polymer having a weak intermolecular force and a low molecular weight (small solubility parameter (SP value)) and means a polymer having a solubility parameter (SP value) of 8.0 $(cal/cm^3)^{1/2}$ or less in the present specification. The low polar polymer is at least one kind selected from the group consisting of paraffin wax (SP value of 7.0 to 8.0 $(cal/cm^3)^{1/2}$, melting point of 48 to 60° C.), polyisobutylene (SP value of 8.0 $(cal/cm^3)^{1/2}$, melting point of 44° C.), polyethylene (SP value of 7.9 $(cal/cm^3)^{1/2}$, melting point of 105 to 137° C.), and polypropylene (SP value of 7.8 to 8.0 $(cal/cm^3)^{1/2}$, melting point of 158 to 168° C.), and, of these, paraffin was is preferable. The paraffin wax has a melting point of 48° C., and, when a porous substrate (support) is immersed in the paraffin wax from the outer surface, the paraffin wax is immediately solidified in about one minute. Therefore, since the paraffin wax hardly penetrate to the internal portion, it is preferable as a low polar polymer. On the other hand, since the nonpolar polymer in the EP 1163046 A1 penetrates to the internal portion because the solidification takes at least 20 minutes, it is difficult to thin the membrane.

In a method for manufacturing a zeolite membrane of the present invention, after a surface layer is formed by the use of the low polar polymer, the porous substrate is impregnated with a high polar polymer having low compatibility with the low polar polymer to obtain a masking polymer. Low compatibility with the low polar polymer means that a difference in SP value between the low polar polymer and the masking polymer is 1.0 $(cal/cm^3)^{1/2}$ or more. By forming the surface layer with the low polar polymer, a hydrophilic high polar polymer can be used as the masking polymer, and various seed crystal application methods can be employed. Though the EP 1163046 A1 recommends a polar polymer, long time impregnation is required for the complete melt by the use of a solvent in the case of a high polar polymer, and it is necessary to remove electric charge upon applying a seed crystal because the surface has an electric charge. Thus, the operation becomes complex to a large extent in manufacturing a membrane. Since a surface layer of the low polar polymer can be removed in a few hours (e.g., about two hours), it can be removed in a shorter time than the surface layer in the "Journal of Membrane Science", and a manufacturing method of the present invention can decrease the operation time.

It is preferable that the seed crystal attaching step employs a dipping method where the porous substrate is immersed in a seeding sol. However, a suitable method can be selected, such as a spin coating method and a filtration coat method.

Hereinbelow, each step will be described by the use of FIGS. 1A to 1E. FIGS. 1A to 1E are cross sectional views of a porous substrate 1 in each step. In the case that the porous substrate 1 has a tube shape, though it has the outer surface and the inner surface, one surface selected as necessary is referred to as the "first surface". In the case of using a commercially available multi-channel monolith ceramic filter, the inner surface of a hole of the multi-channel monolith is referred to as the "first surface".

Figure 1A:
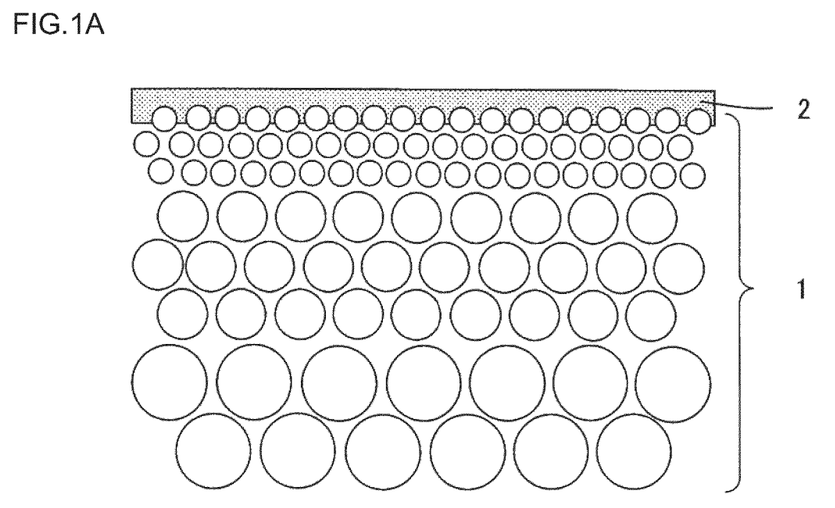
FIG. 1A is a schematic view showing a zeolite membrane manufacturing step of the present invention and a view showing the formation of the surface layer in the surface layer forming step.

(1) Surface Layer Forming Step:

In the surface layer forming step, a low polar polymer is attached on the first surface of the porous substrate 1 to form a surface layer 2 covering the surface.

(1-1) Porous Substrate:

The "porous substrate" used in the present invention is a member made of ceramic and having a large number of pores which three-dimensionally pass through and, after a zeolite membrane 5 is formed on the surface, functions as a support for the membrane and enables gas to permeate.

As the ceramic constituting the porous substrate 1, a conventionally known ceramic such as alumina, zirconia ($ZrO_2$), and mullite ($3Al_2O_3 \cdot 2SiO_2$) can be used. In the present invention, a porous substrate 1 made of alumina is particularly suitably used since an article on the market can easily be obtained, and uniform microparticles with high purity can be obtained by a simple manufacturing method of hydrolysis of alkoxide.

The porous substrate 1 has a porosity of preferably 20 to 60%, more preferably 25 to 40%. When the porosity is below the aforementioned range, the resistance (pressure loss) when gas passes is large, and, in the case that the formed zeolite membrane 5 is used as a gas separation membrane, gas permeance (treatment capacity of gas separator) may be deteriorated, which is not preferable. When the porosity is above the aforementioned range, mechanical strength required as a support for the zeolite membrane 5 may remarkably be deteriorated, which is not preferable. Incidentally, in the present specification, "porosity" means porosity measured by a mercury porosimeter.

The porous substrate 1 has an average pore size of preferably 0.003 to 10 μm. When the average pore size is below the aforementioned range, the resistance (pressure loss) when gas passes is large, and, in the case that the formed zeolite membrane 5 is used as a gas separation membrane, gas permeance (processing capacity of gas separator) may be deteriorated, which is not preferable. When the average pore size is above the aforementioned range, mechanical strength required as a support for the zeolite membrane 5 may remarkably be deteriorated, which is not preferable.

Incidentally, in the present specification, "average pore size" means a pore size measured by the mercury porosimetry and calculated from the pressure at the time the cumulative volume of mercury injected into the porous substrate 1 becomes 50% of the entire pore capacity of the porous substrate 1.

The ceramic porous substrate 1 may be formed to have multi layers of a porous support having a large number of pores, an intermediate layer having pores having an average pore size smaller than that of the porous support on the surface of the porous support, and a surface layer having an average pore size smaller than that of the intermediate layer on the surface of the intermediate layer (see FIG. 1A). In this case, a zeolite membrane 5 is formed as the surface layer. Since, in a method for manufacturing a zeolite membrane of the present application, a surface layer 2 using a low polar polymer is formed, and then a masking polymer is filled, a surface layer 2 which is to be removed can be formed thinly, and zeolite is inhibited from entering the internal portion of the porous substrate 1. Therefore, the method can be applied even to a porous substrate 1 whose surface (surface layer) for forming a zeolite membrane has an average pore size larger than a conventional one. Therefore, it is not necessary to decrease the average pore size of the surface layer by forming multi layers as described above, and a zeolite membrane can be formed within the range of 0.003 to 10 μm in the present application while a conventional one had a surface layer having an average pore size of preferably 1 μm or less. That is, a porous substrate 1 having a pore size in a wide range can be used.

In addition, a material except for ceramics for constituting a porous substrate 1 may be, for example, a filter using a material excellent in resistance to chemicals and thermal resistance such as stainless steel, or a stainless steel plate having holes of 0.01 to 0.3 μm.

(1-2) Low Polar Polymer:

The aforementioned low polar polymer is applied on only the first surface of the porous substrate 1 to form a surface layer 2. FIG. 1A shows a state that the surface layer 2 is formed in the surface layer forming step. Though there is no particular limitation on the method of applying the low polar polymer, an application method where the porous substrate 1 is immersed in a molten low polar polymer is desirable because it is simple and can apply the polymer uniformly. If the porous substrate 1 is impregnated with the low polar polymer up to the internal portion, the masking polymer with which the porous substrate 1 is impregnated later cannot cause impregnation up to the surface. Therefore, it is desirable that the low polar polymer is applied on only the surface, and therefore, it is necessary to have an appropriate viscosity by heating the solvent for dissolving the lower polar polymer. It is preferable that the surface layer 2 formed with the low polar polymer has a thickness of 1 to 2 μm with a part thereof being formed in the porous substrate 1 and the rest being formed on the first surface of the porous substrate 1.

In addition, it is desirable that the low polar polymer hardly penetrates to the internal portion of the porous substrate 1, and a substance which solidifies rapidly after immersion is desirable because it does not penetrate to the internal portion of the porous substrate 1 after immersion. Specifically, the low polar polymer can be applied uniformly on the surface by melting the low polar polymer (e.g., paraffin wax) by double-boiling and dipping the porous substrate 1 (e.g., alumina substrate) into the polymer.

Figure 1B:
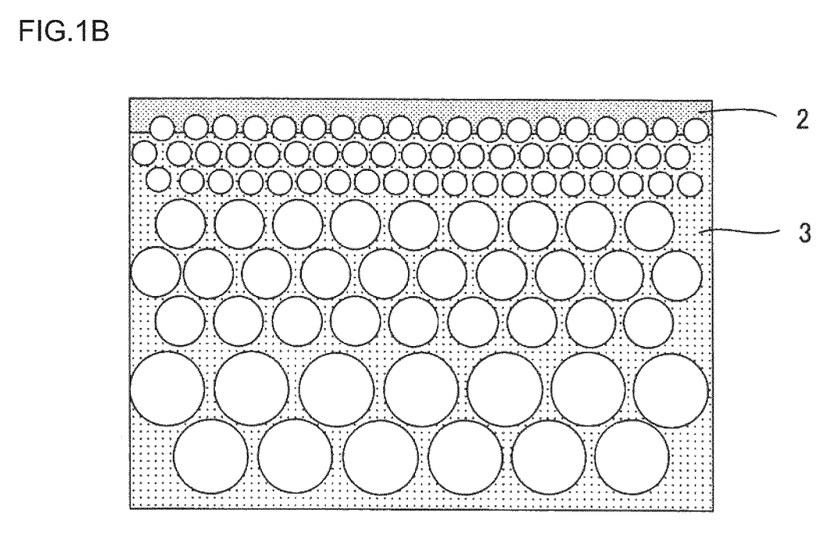
FIG. 1B is a schematic view showing a zeolite membrane manufacturing step of the present invention, which follows FIG. 1A, and a view showing impregnation with a masking polymer in a filling step.

(2) Filling Step:

After the surface layer 2 is formed with a low polar polymer in the surface layer forming step, the porous substrate 1 is impregnated with a high polar polymer having a SP value of above 8.0 $(cal/cm^3)^{1/2}$ as a masking polymer 3 into pores in the porous substrate 1 from a surface different from the first surface of the porous substrate 1 up to the surface layer 2, and the high polar polymer is solidified in the filling step. The high polar polymer in the present specification means a polymer having a SP value of above 8.0 $(cal/cm^3)^{1/2}$. FIG. 1B shows a state of impregnation with the masking polymer 3 in the filling step.

The masking polymer 3 can be solidified by the impregnation therewith in the porous substrate 1 and is a polymer remaining in the porous substrate without being melted or decomposed even at the time of hydrothermal synthesis. The masking polymer 3 is dissolved in a solvent such as acetone to impregnate the porous substrate 1 with the solution. For example, a tube-shaped porous substrate 1 is plugged on one side and impregnated with the molten masking polymer 3 from the other side without plugging. Thus, the porous substrate 1 can be impregnated with the masking polymer 3 from the side of the inner surface different from the first surface of the porous substrate 1.

The polymer used as the masking polymer 3 is preferably incompatible with the low polar polymer applied on the surface because, when the polymer is compatible with the low polar polymer, the masking polymer 3 melts when the low polar polymer is removed by a solvent in the subsequent step. Specifically, the solubility parameter (SP value) is different by desirably 1.0 $[(cal/cm^3)^{1/2}]$ or more, more desirably 2.0 $[(cal/cm^3)^{1/2}]$ or more from that of the low polar polymer applied on the surface. For example, when the SP value of the low polar polymer is 7 to 8, the SP value of the masking polymer 3 is desirably 9 to 10 or more.

Depending on the kind of the zeolite to be synthesized, high synthesis temperature may be required. In that case, since it is desirable that the masking polymer 3 remains without being melted or decomposed even at the time of hydrothermal synthesis, it is preferable that the melting point is not lower than the zeolite synthesis temperature. That is, it is preferable that the melting point of the masking polymer 3 is higher than formation temperature of the zeolite membrane 5 in the membrane forming step. Though the temperature for hydrothermal synthesis differs from 80 to 300° C. depending on the kind of the zeolite, it is 140° C. or more, desirably 150 to 200° C. Therefore, the melting point of the masking polymer 3 is preferably higher than 150° C. In addition, since the masking polymer 3 is removed by heat burning later, the masking polymer 3 decomposed and disappeared at 200 to 800° C. is preferable.

The synthesis temperature of zeolite is so wide as about 80 to 300° C., and, for application to many kinds of zeolite, it is desirable to use a polymer having a high melting point as the masking polymer. Since many polymers having a high melting point are high polar polymers, it is considered easy and convenient to select a high polar polymer when a polymer having a high melting point is selected. In addition, a polymer compatible with the polymer forming the surface layer 2 cannot be used as the masking polymer. Therefore, by employing a low polar polymer as the polymer forming the surface layer 2, a high polar polymer can be used as the masking polymer.

Examples of the masking polymer 3 include polymethylmethacrylate resin (SP value of 9.25 $(cal/cm^3)^{1/2}$, melting point of 160 to 200° C.), polystyrene (SP value of 8.6 to 9.7 $(cal/cm^3)^{1/2}$, melting point of 230 to 240° C.), nitrile rubber (SP value of 9.4 $(cal/cm^3)^{1/2}$), vinyl acetate resin (SP value of 9.4 $(cal/cm^3)^{1/2}$), polyvinyl chloride (SP value of 9.5 to 9.7 $(cal/cm^3)^{1/2}$, melting point of 212° C.), epoxy resin (SP value of 9.7 to 10.9 $(cal/cm^3)^{1/2}$, melting point of 80 to 180° C.), phenol resin (SP value of 11.5 $(cal/cm^3)^{1/2}$), nylon (SP value of 12.7 to 13.6 $(cal/cm^3)^{1/2}$, melting point of 147 to 295° C.), polyacrylonitrile (SP value of 15.4 $(cal/cm^3)^{1/2}$, melting point of 317° C.), polycarbonate (SP value of 9.8 $(cal/cm^3)^{1/2}$, melting point of 205 to 230° C.), polyamide (SP value of 13.6 $(cal/cm^3)^{1/2}$, melting point of 224° C.), cellulose acetate (SP value of 11.3 $(cal/cm^3)^{1/2}$, melting point of 306° C.), and polyethylene telephthalate (SP value of 10.7 $(cal/cm^3)^{1/2}$, melting point of 220 to 267° C.). For example, when polymethylmethacrylate resin (PMMA) is used as the masking polymer 3, since the PMMA has a melting point of nearly 200° C., it can correspond with many kinds of zeolite.

Figure 1C:
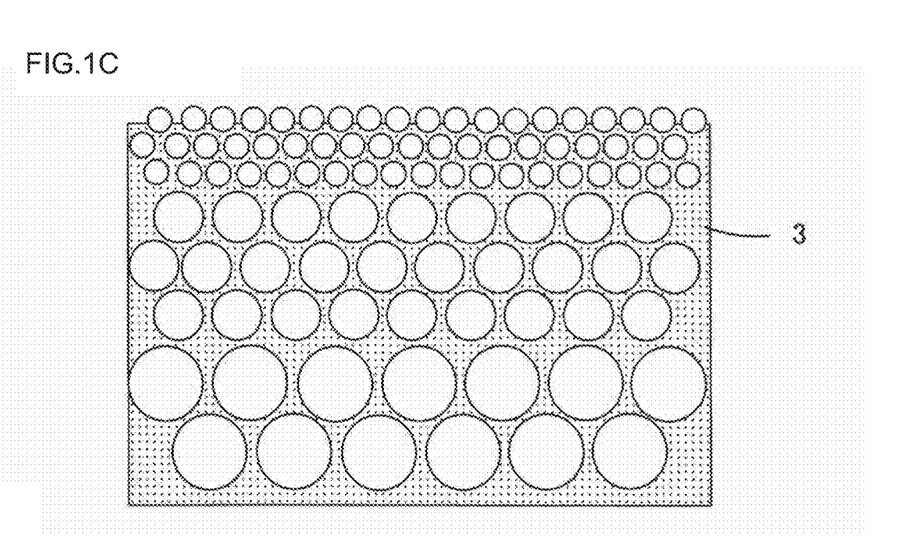
FIG. 1C is a schematic view showing a zeolite membrane manufacturing step of the present invention, which follows FIG. 1B, and a view showing a state that the surface layer is removed in a surface layer removing step.

(3) Surface Layer Removing Step:

Next, the surface layer removing step for removing the surface layer 2 formed with the low polar polymer is performed. FIG. 1C shows a state that the surface layer 2 is removed in the surface layer removing step. The porous substrate 1 is immersed in a solvent (e.g., n-hexane (SP value of 7.3)) where only the low polar polymer is dissolved for 1 to 5 hours to dissolve only the low polar polymer (e.g., paraffin wax) on the surface, thereby exposing the surface of the porous substrate 1 (e.g., alumina substrate). When paraffin wax is used as the low polar polymer, it can be removed completely in about two hours by acetone or n-hexane. By drying for 30 minutes in a drying furnace at 70° C., a solvent used for the removal can be removed completely.

(4) Seed Crystal Attaching Step:

In order to produce a zeolite membrane 5, a zeolite powder of the same kind as the membrane to become a seed crystal is necessary. Examples of the zeolite powder to become a seed crystal include conventionally known zeolite powders of LTA, MFI, MOR, AFI, FER, FAU, DDR, and CHA. From the zeolite powders having different crystal structures (pore structures), a zeolite powder is suitably selected according to the usage or the like of the zeolite membrane 5. A DDR type zeolite can be used particularly suitably in that it can be applied to industrially effective usage such as removal of carbon dioxide because it has a characteristic of selectively transmitting gases such as carbon dioxide ($CO_2$). Hereinbelow, description will be given with a DDR type zeolite membrane 5 as an example.

As the DDR type zeolite seed crystal, it is preferable to use a micro powder obtained by manufacturing a DDR type zeolite powder according to the method for manufacturing a DDR type zeolite described in "M. J. denExter, J. C. Jansen, H. van Bekkum, Studies in Surface Science and Catalysis Vol. 84, Ed. by J. Weitkamp et al., Elsevier (1994) 1159-1166" and pulverizing the powder. The seed crystal after pulverization preferably has predetermined particle diameters by the use of a sieve or the like. The particle diameter of the zeolite powder to become a seed crystal is desirably about the same as the average pore size of the porous substrate 1.

In the seed crystal attaching step, a seed crystal functioning as a seed for forming a zeolite membrane 5 is attached to the first surface of the porous substrate 1 where the surface layer 2 is removed. There is no particular limitation on the technique for attaching the DDR type zeolite seed crystal to the surface of the porous substrate, and a technique generally used by a person of ordinary skill in the art may be employed. For example, a dispersion liquid (sol for seeding) obtained by dispersing the DDR type zeolite seed crystal in water is prepared, and the DDR type zeolite seed crystal is applied to the region for forming the DDR type zeolite membrane 5 of the surface of the porous substrate by selecting a method from a falling-drop method, a dipping method, a filtration coating method, a spin coating method, a printing method, and the like in accordance with the purpose. Of these, a dipping method, where the porous substrate 1 is immersed in a sol for seeding, is preferable because it is easy and convenient. Conventionally, there has been a tendency of increasing the thickness of the zeolite layer in the dipping method. However, in a manufacturing method of the present invention, a zeolite layer thinner than a conventional one can be formed.

(5) Membrane Forming Step:

In the DDR type zeolite membrane manufacturing method of the present embodiment, the membrane forming step is a step where the porous substrate 1 having a DDR type zeolite seed crystal grain formed on the surface thereof is immersed in a membrane-forming sol containing 1-adamantanamine, silica, and water and subjected to hydrothermal synthesis to form the DDR type zeolite membrane 5 on the surface of the porous substrate 1. The DDR type zeolite membrane 5 formed on the surface of the porous substrate 1 is a membrane obtained in such a manner that a plurality of DDR type zeolite crystal grains formed on the surface of the porous substrate 1 has grown into a membrane by hydrothermal synthesis.

Though the membrane-forming sol in the membrane forming step contains 1-adamantanamine, silica, and water, ethylenediamine and other additives may be mixed with the sol. 1-adamantanamine is a structure directing agent for forming a DDR type zeolite membrane 5. For example, when a slight amount of sodium aluminate is used as an additive, Al can be substituted for a part of Si constituting the DDR type zeolite membrane 5. Such substitution can impart catalysis and the like besides the separation function to the resultant DDR type zeolite membrane 5. Upon preparing the membrane-forming sol, the ratio of 1-adamantanamine to silica (1-adamantanamine/silica (molar ratio)) is preferably 0.002 to 0.5, more preferably 0.002 to 0.2. When it is smaller than 0.002, 1-adamantanamine as the structure directing agent is insufficient for the formation of the DDR type zeolite, while, when it is larger than 0.5, the amount of 1-adamantanamine to be used is increased, which may lead to increase in production costs. The ratio of water to silica (water/silica (molar ratio)) is preferably 10 to 500, more preferably 10 to 200. When it is smaller than 10, the silica concentration is too high, and the formation of the DDR type zeolite may be hard, while, when it is larger than 500, the silica concentration is too low, and the formation of the DDR type zeolite may be hard.

It is preferable that the membrane-forming sol contains ethylenediamine. By preparing a membrane-forming sol with adding ethylenediamine thereto, 1-adamantanamine can easily be dissolved, and a DDR type zeolite membrane 5 having uniform thickness can be manufactured. The ratio of ethylenediamine to 1-adamantanamine (ethylenediamine/1-adamantanamine (molar ratio)) is preferably 4 to 35, more preferably 8 to 32. When it is smaller than 4, the amount is insufficient for easily dissolving 1-adamanthanamine, while, when it is larger than 35, ethylenediamine without contributing to the reaction is excessive, and production costs may be increased.

In addition, it is preferable to prepare the 1-adamantanamine solution by dissolving 1-adamantanamine in ethylenediamine in advance. By the use of the membrane-forming sol prepared by mixing the 1-adamanthanamine solution prepared as described above and a silica sol solution containing silica, 1-adamanthanamine is dissolved easily, conveniently, and safely, and a DDR type zeolite membrane 5 having uniform thickness can be manufactured. Incidentally, though the silica sol can be prepared by dissolving micronized silica in water or by subjecting alkoxide to hydrolysis, a marketed silica sol can be used by adjusting the silica concentration.

A hydrothermal synthesis method with immersing a porous substrate 1 having DDR type zeolite crystal grains formed on the surface thereof in the membrane-forming sol is as follows.

A porous substrate 1 having DDR type zeolite crystal grains formed on the surface thereof is put in a pressure resistant container or the like containing the membrane-forming sol and maintained for predetermined time at predetermined temperature described below for hydrothermal synthesis to form a DDR type zeolite membrane 5 on the surface of the porous substrate 1. In the membrane forming step, the temperature condition for the hydrothermal synthesis is preferably 140 to 200° C., more preferably 150 to 165° C. In the case of hydrothermal synthesis at temperature below 140° C., the formation of the DDR type zeolite membrane 5 may be difficult. In the case of hydrothermal synthesis at temperature above 200° C., a crystal phase such as a DOH type zeolite which is different from the DDR type zeolite may be formed.

The thickness of the DDR type zeolite membrane 5 formed on the surface of the porous substrate 1 is preferably 100 µm or less. When it is larger than 100 µm, the permeance of the fluid to be treated passing through the resultant DDR type zeolite membrane 5 may be low. The thickness of the DDR type zeolite membrane 5 is the average value of the membrane thicknesses measured with an electron microscope photograph at five points in a cross section cut along the thickness direction.

The membrane forming step may be performed several times. In this case, after performing the membrane forming step several times, the DDR type zeolite membrane forming step is performed. In the case of performing the membrane forming step several times, it is preferable to prepare a membrane-forming sol each time.

Figure 1D:
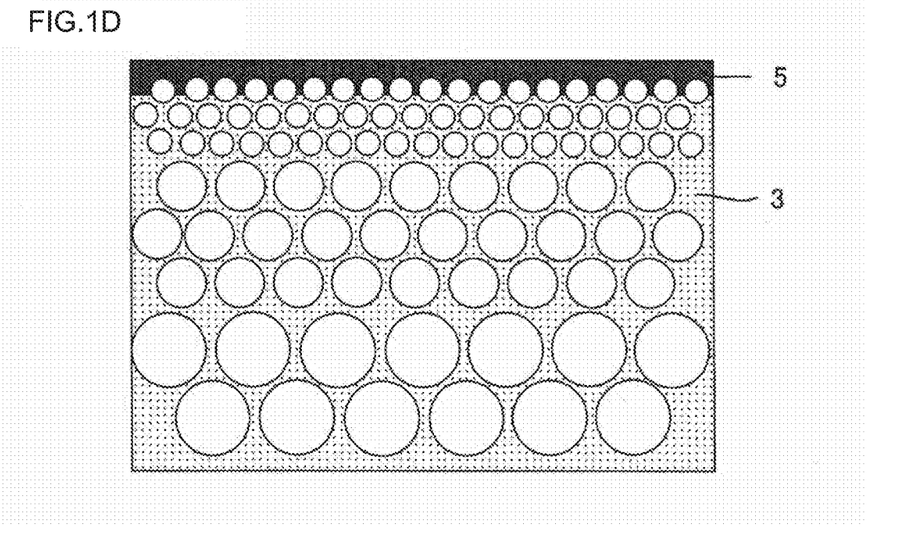
FIG. 1D is a schematic view showing a zeolite membrane manufacturing step of the present invention, which follows FIG. 1C, and a view showing a state that a zeolite membrane is formed in a seed crystal attaching step and a membrane forming step.

FIG. 1D shows a state that a zeolite membrane 5 is formed in a seed crystal attaching step and a membrane forming step.

Figure 1E:
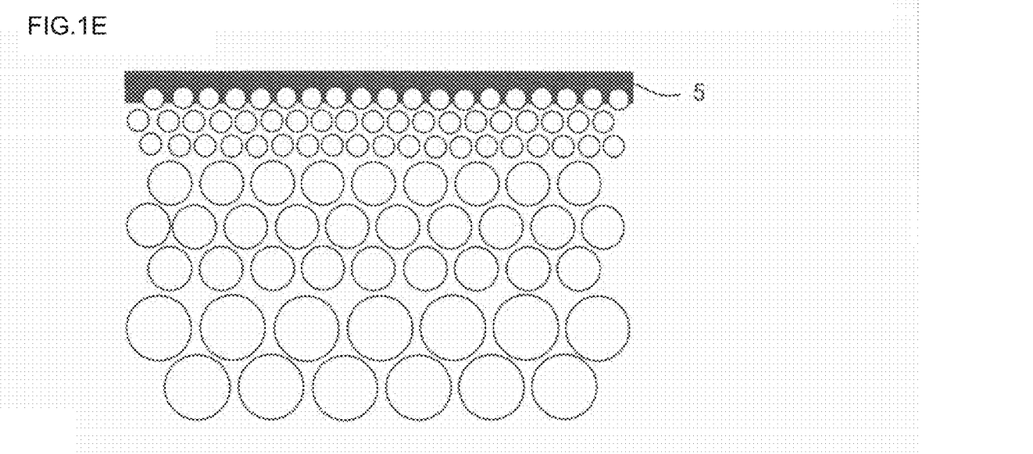
FIG. 1E is a schematic view showing a zeolite membrane manufacturing step of the present invention, which follows FIG. 1D, and a view showing a state that the structure directing agent and the masking polymer are removed in a removing step.

(6) Removing Step:

By firing at 400 to 700° C. for 4 to 100 hours by the use of an electric furnace or the like to remove the structure directing agent from the dense zeolite membrane 5 and the masking polymer 3 from the porous substrate 1, a zeolite membrane 5 usable as a separation membrane can be obtained. FIG. 1E shows a state that the structure directing agent and the masking polymer 3 are removed in the removing step.

The aforementioned zeolite membrane 5 (zeolite separation membrane-disposed article) manufactured by a method for manufacturing a zeolite membrane of the present invention can be used for separation of a mixed fluid containing two or more different components. Examples of the components include a mixed gas of $CO_2$ and $CH_4$ and a mixed gas of $CO_2$ and $N_2$.

According to a method for manufacturing a zeolite membrane of the present invention, the thickness of the zeolite membrane 5 is 1 to 30 µm, preferably 1 to 20 µm, more preferably 1 to 2 µm. When the thickness is below 1 µm, it may be impossible to completely coat the surface of the support with a dense membrane, and the separation factor may become low when a mixed gas or the like is separated. When it is above 30 µm, it may be impossible to obtain a sufficient permeation flux. Here, the thickness of the zeolite membrane 5 is a value obtained by observing across section of the separation membrane with a scanning electron microscope (SEM), and a membrane thickness of 1 to 30 µm means that the minimum membrane thickness is 1 µm or more with the maximum membrane thickness of 30 µm or less. As described above, a method for manufacturing a zeolite membrane of the present invention enables to manufacture a zeolite membrane a part of which is formed in the porous substrate and the rest of which is formed on the surface of the porous substrate to have a thickness of 1 to 2 µm with a separation factor of $CO_2$ with respect to $CH_4$ of 10 or more and a permeance of $CO_2$ gas of $5 \times 10^{-7}$ mol/s/m²/Pa or more.

Hereinbelow, the present invention will be described in more detail on the basis of Examples. However, the present invention is by no means limited to the Examples.

1. Manufacturing of Zeolite Membrane 1-1. Example 1

In the present invention, there were used a tube-shaped alumina substrate (a ceramic produced by NGK Insulators, Ltd., was cut for use, average pore size of 0.2 µm, diameter of 10 mm, and length of 100 mm) as the porous substrate 1 and paraffin wax (melting point of 48° C., SP value of 7.0 to 8.0) as the low polar polymer.

In the first place, a low polar polymer was applied to only the surface (outer surface of the tube) of the alumina substrate (porous substrate 1). Specifically, paraffin wax was dissolved by heating in a hot water bath, and the alumina substrate (porous substrate 1) was dipped in the paraffin wax for the uniform application on the surface.

After the low polar polymer was applied to the surface (outer surface of the tube) of the alumina substrate (porous substrate 1), the internal portion of the alumina substrate was impregnated with the masking polymer 3 dissolved in a solvent. As the masking polymer 3, polymethylmethacrylate resin (SP value of 10.0, melting point of about 200° C., decomposition and disappearance temperature of about 300° C.) was dissolved in acetone. One side of the tube-shaped alumina substrate (porous substrate 1) was plugged, and, by impregnation with the dissolved masking polymer 3 from the other side without plugging, the alumina substrate was impregnated with the masking polymer 3 from the inner surface side of the tube. At this time, for sufficient impregnation with the dissolved polymethylmethacrylate, the substrate was put in a vacuum chamber, and a defoaming treatment was performed.

After the alumina substrate was dried for one day by wind to confirm solidification of the polymethylmethacrylate resin, in order to remove the low polar polymer (paraffin wax) on the surface, the alumina substrate was immersed in a solvent (n-hexane (SP value of 7.3)) which could dissolve only the low polar polymer for two hours, and only the low polar polymer on the surface was dissolved to expose the surface of the alumina substrate. N-hexane was removed by drying in a drying furnace at 70° C. for 30 minutes.

A DDR (Deca-Dodecasil 3R) type zeolite crystal was produced by subjecting a raw material solution obtained by adjusting a predetermined chemical to hydrothermal synthesis and pulverized by the use of a mortar, a ball mill, and the like to obtain a zeolite powder functioning as a seed crystal. By immersing the alumina substrate in the seed crystal slurry obtained by dispersing the zeolite powder in water (dipping method), the zeolite powder functioning as a seed crystal was applied to the portion exposed to the surface of the alumina substrate and dried.

Next, a raw material solution obtained by mixing colloidal silica, 1-adamantanamine, ethylenediamine, water together at the ratio of 1:0.04:0.6:50 with a shaking apparatus (200 pm) and an alumina substrate where the seed crystal was applied were put in a pressure container for hydrothermal synthesis at 150° C. for 24 hours to synthesize a DDR type zeolite membrane 5. The resultant DDR type zeolite membrane 5 was subjected to cleaning with boiling for 20 minutes and then dried.

Then, in order to remove the structure directing agent and the masking polymer 3 from the DDR type zeolite membrane 5, temperature was raised at 0.2° C./min. by the use of an electric furnace, and firing was performed at 700° C. for 6 hours to obtain a zeolite membrane 5.

1-2. Comparative Example 1 (Conventional Method)

In the same manner as in Example, a DDR (Deca-Dodecasil 3R) type zeolite crystal was produced by subjecting a raw material solution where a predetermined chemical was prepared to hydrothermal synthesis, and the crystal was pulverized by the use of a mortar, a ball mill, and the like to obtain a zeolite powder functioning as a seed crystal. Unlike the Example, with using neither a low polar polymer nor a masking polymer 3, the alumina substrate (porous substrate 1) was immersed in the seed crystal slurry where a zeolite powder functioning as a seed crystal was dispersed in water or the like to apply the seed crystal to the surface of the substrate.

Next, a raw material solution prepared by adjusting the amounts of 1-adamantanamine, ethylenediamine, colloidal silica, and water to the predetermined amounts and mixing them together and alumina substrate having a seed crystal applied thereto were subjected to hydrothermal synthesis at predetermined temperature for a predetermined period of time to obtain a zeolite membrane 5 on the surface of alumina substrate. After the zeolite membrane 5 was washed with water, firing was performed to remove 1-adamantanamine as the structure directing agent contained in the zeolite membrane 5.

2. Zeolite Membrane Evaluation Method (Common to Example 1 and Comparative Example 1 (Conventional Method))

Figure 2A:
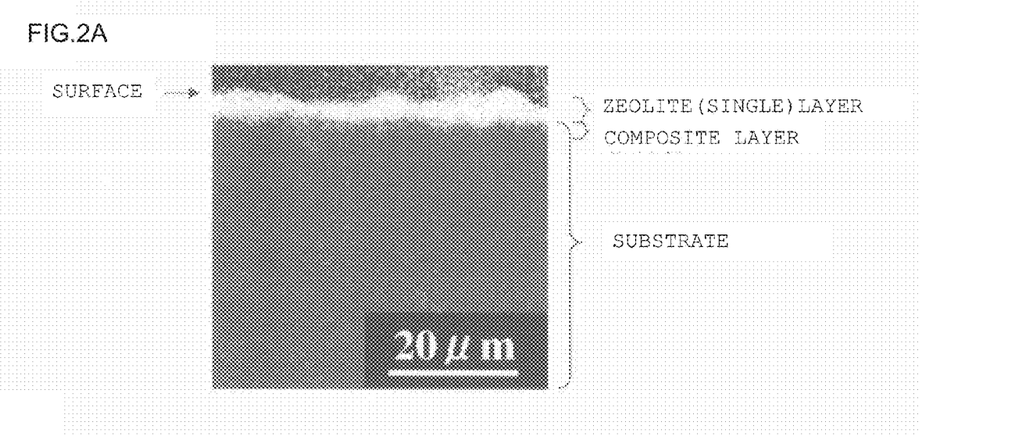
FIG. 2A is a photograph showing a distribution of Si in a cross section by a scanning electron microscope of Example 1.
Figure 2B:
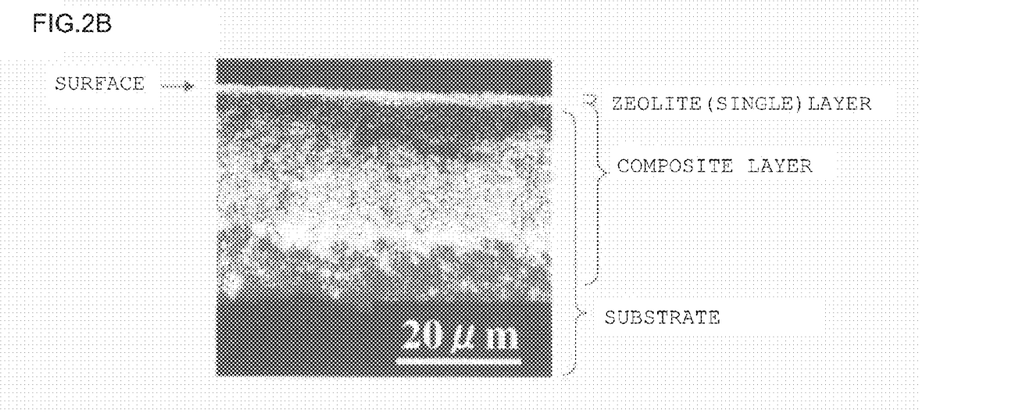
FIG. 2B is a photograph showing a distribution of Si in a cross section by a scanning electron microscope of Comparative Example 1.

Thickness of the zeolite membrane 5 obtained above was checked by observing a cross section of the zeolite membrane by the use of a scanning electronic microscope (FE-SEM JSM 6701-F produced by JEOL Ltd.) and an energy dispersive X-ray analyzer (JED-2300). A cross section photograph by the scanning electron microscope of Example 1 is shown as FIG. 2A. and a cross section photograph of Comparative Example 1 is shown in FIG. 2B. Incidentally, the composite layer in each of the Figures is a layer (layer of the substrate and the zeolite membrane) of the zeolite membrane 5 permeating the alumina substrate (porous substrate 1). White dots in FIGS. 2A and 2B show a distribution of Si and are DDR type zeolite.

Figure 3:
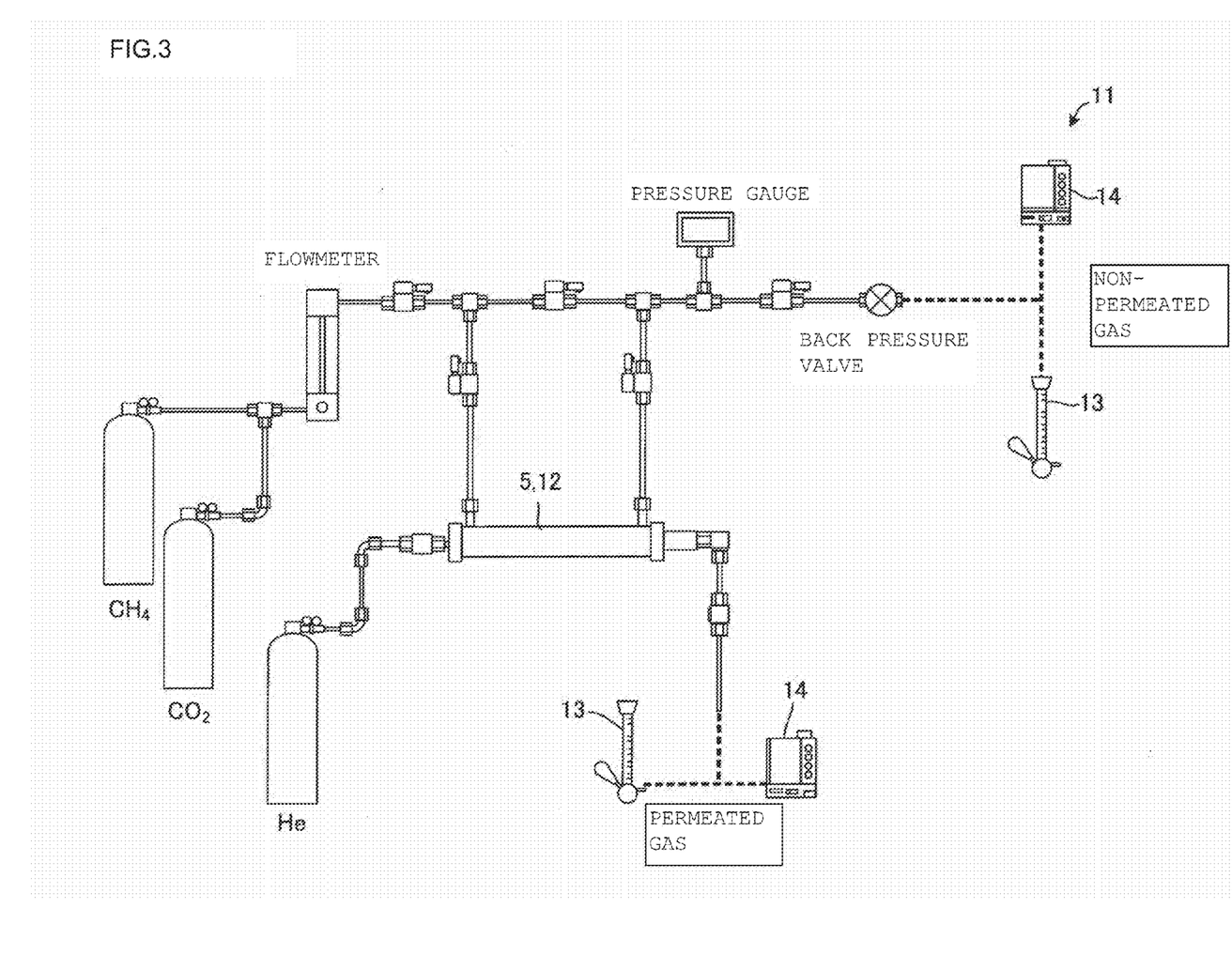
FIG. 3 is a schematic view showing a membrane permeation testing apparatus.

The permeation property of the zeolite membrane 5 was checked by the membrane permeation testing apparatus shown in FIG. 3. The membrane permeation testing apparatus is provided with a separation module 12 having a zeolite-arranged body where a DDR type zeolite membrane 5 is disposed. To the separation apparatus 12 were connected $CH_4$, $CO_2$, He gas cylinders, which can supply gas to the zeolite membrane 5. In addition, downstream of the separation apparatus 12, a soap film flowmeter 13 and a gas chromatography 14 (TCD: Thermal Conductivity Detector) are provided. The apparatus is constituted in such a manner that mixed gas of $CH_4$ and $CO_2$ is separated by the zeolite membrane 5 of the separation apparatus 12, and measurement for flow rate is performed as permeated gas and non-permeated gas.

Mixed gas of $CO_2$ and $CH_4$ at a ratio of 5:5 was supplied to the zeolite membrane 5 at 500 mL/min., and the gas which permeated the zeolite membrane 5 was swept at 500 mL/min. (atmospheric pressure He sweep test) by the use of He gas.

The permeated gas of the zeolite membrane 5 was collected with a syringe, and composition of the gas was measured by a gas chromatograph (GC8-A produced by Shimadzu Corporation). The amount of the gas which permeated the zeolite membrane was measured by the use of a soap film flowmeter and a stopwatch. The results are shown in Table 1. Incidentally, the separation factor was obtained from the following formula.

Separation factor=((CO$_2$ concentration in permeated gas)/(CH$_4$ concentration in permeated gas))/((CO$_2$ concentration in supply gas)/(CH$_4$ concentration in supply gas))

TABLE 1

|  | Example 1 | Comp. Ex. 1 |
|---|---|---|
| Separation factor α | 25 | 48 |
| CO$_2$ permeance [mol/s/m$^2$/Pa × 10$^{-3}$] | 57.5 | 7.98 |
| Thickness of composite layer (μm) | 3.0 | 33 |

The CO$_2$ permeance of the DDR type zeolite membrane 5 obtained in the present invention was about 7 times the permeance of the conventional membrane. In addition, since the concentration of the gas separated by the DDR type zeolite membrane 5 produced in the present invention was 25 times the concentration of CH$_4$, it was confirmed that the membrane functioned as a gas separating membrane. By the observation of a cross section of the DDR type zeolite membrane 5 by the use of a scanning electron microscope and an energy dispersive X-ray analyzer, it was confirmed that the thickness of the DDR type zeolite membrane 5 obtained in the present invention was about one tenth of the thickness of the conventional membrane.

A method for manufacturing a zeolite membrane of the present invention can suitably be employed as a method for manufacturing a zeolite membrane which has high permeation property and high separation performance and which can be used as a separation membrane for gas separation or the like.

What is claimed is:

1. A method for manufacturing a zeolite membrane comprising:
   a surface layer forming step for forming a surface layer by attaching a low polar polymer having a solubility parameter (SP value) of 8.0 (cal/cm$^3$)$^{1/2}$ or less to a first surface of a porous substrate to cover the surface,
   a filling step for filling a high polar polymer having low compatibility with the low polar polymer and a SP value of above 8.0 (cal/cm$^3$)$^{1/2}$ as a masking polymer into pores in the porous substrate from a surface different from the first surface of the porous substrate up to the surface layer by impregnating the porous substrate with the high polar polymer and solidifying the high polar polymer,
   a surface layer removing step for removing the surface layer,
   a seed crystal attaching step for attaching a seed crystal functioning as a seed for forming a zeolite membrane on the first surface of the porous substrate where the surface layer has been removed,
   a membrane forming step for forming a dense zeolite membrane containing a structure directing agent on the first surface of the porous substrate by growing the seed crystal, and
   a removing step for removing the structure directing agent from the dense zeolite membrane and removing the masking polymer from the porous substrate.

2. The method for manufacturing a zeolite membrane according to claim 1, wherein the surface layer has a thickness of 1 to 2 μm with a part thereof being formed in the porous substrate and the rest being formed on the first surface of the porous substrate.

3. The method for manufacturing a zeolite membrane according to claim 1, wherein the low polar polymer is at least one kind selected from the group consisting of paraffin wax, polyisobutylene, polyethylene, and polypropylene.

4. The method for manufacturing a zeolite membrane according to claim 2, wherein the low polar polymer is at least one kind selected from the group consisting of paraffin wax, polyisobutylene, polyethylene, and polypropylene.

5. The method for manufacturing a zeolite membrane according to claim 1, wherein the masking polymer has a melting point higher than zeolite membrane forming temperature in the membrane forming step.

6. The method for manufacturing a zeolite membrane according to claim 2, wherein the masking polymer has a melting point higher than zeolite membrane forming temperature in the membrane forming step.

7. The method for manufacturing a zeolite membrane according to claim 3, wherein the masking polymer has a melting point higher than zeolite membrane forming temperature in the membrane forming step.

8. The method for manufacturing a zeolite membrane according to claim 4, wherein the masking polymer has a melting point higher than zeolite membrane forming temperature in the membrane forming step.

9. The method for manufacturing a zeolite membrane according to claim 1, wherein the seed crystal attaching step employs a dipping method where the porous substrate is immersed in a sol for seeding.

10. The method for manufacturing a zeolite membrane according to claim 2, wherein the seed crystal attaching step employs a dipping method where the porous substrate is immersed in a sol for seeding.

11. The method for manufacturing a zeolite membrane according to claim 3, wherein the seed crystal attaching step employs a dipping method where the porous substrate is immersed in a sol for seeding.

12. The method for manufacturing a zeolite membrane according to claim 4, wherein the seed crystal attaching step employs a dipping method where the porous substrate is immersed in a sol for seeding.

13. The method for manufacturing a zeolite membrane according to claim 5, wherein the seed crystal attaching step employs a dipping method where the porous substrate is immersed in a sol for seeding.

14. The method for manufacturing a zeolite membrane according to claim 6, wherein the seed crystal attaching step employs a dipping method where the porous substrate is immersed in a sol for seeding.

15. The method for manufacturing a zeolite membrane according to claim 7, wherein the seed crystal attaching step employs a dipping method where the porous substrate is immersed in a sol for seeding.

16. The method for manufacturing a zeolite membrane according to claim 8, wherein the seed crystal attaching step employs a dipping method where the porous substrate is immersed in a sol for seeding.

* * * * *